INVENTOR.
JOSEPH B. WALKER,
BY
Westall & Westall
ATTORNEYS

Patented Sept. 12, 1950

2,522,078

UNITED STATES PATENT OFFICE 2,522,078

TRANSLUCENT RECORDING MEDIUM

Joseph B. Walker, Hollywood, Calif.

Application February 3, 1945, Serial No. 575,983

5 Claims. (Cl. 274—41.6)

This invention relates to recording media on which may be registered, by the novel method hereof, a sound pattern characterized by variations in translucency of the media corresponding to the depth or thickness of translucent material comprising the sound record, reproduction being effected by means actuated in response to the variable intensity of a beam of light transmitted by the media to create electrical impulses of relative frequency, period and amplitude corresponding to the sound pattern.

It is common practice in the prior art to impress a sound record upon a disk or tape composed of plastic or other impressionable substance by means of a stylus connected to a diaphragm and adapted to be vibrated against the plastic in response to sound impulses, so as to produce an indented pattern corresponding to the sound pattern activating the diaphragm. As is well known, reproduction of such a record is effected by similar apparatus, i. e., the sound record is moved against the stylus which is activated by the surface contour of the record to reproduce the vibrations of the diaphragm and accordingly the original sounds of the record. However, in such sound reproducing systems the friction of the stylus produces a sound audible in the loud speaker, which interferes with distinct audition. This is particularly objectionable during reproduction of sounds of low frequency or volume. Fidelity in reproduction is also affected by the difficulty of maintaining a uniform pressure of the stylus on the indented sound track, the sharper vibrations of the stylus, incident to sudden changes in volume or frequency, accordingly being magnified to a certain extent. Similarly, slight variations in the indented track, indicative of corresponding changes in sound recorded, are not faithfully transposed, due to inertia of the diaphragm and stylus.

It is a general object of the present invention to obviate the above-noted and other disadvantages encountered in the prior art means and methods by the provision of translucent recording media, comprising a base coated with an impressionable substance in which an indented record is formed, the translucency of the recording media being variable with the depth of the indentation of the impressed pattern whereby variations in the intensity of light directed therethrough may be utilized to activate sound reproducing equipment.

More specifically, an object is to provide a tape of substantially transparent material bearing two or more layers of dye substances, the upper layer being black or of a color which, when used with an appropriate filter, is opaque, and the other layer or layers being translucent to a degree proportionate with their thicknesses.

Another object is a provision of a colored sound track upon a tape or the like, distinguished by its embodiment of a sound pattern in depth or thickness of a colored substance on a transparent base, whereby a corresponding pattern in translucency is provided, enabling the reproduction of the sound by the intensity of light values which it variably transmits.

Still another object is the provision of a method of producing a sound record comprising a transposition of the characteristics of the individual sound impulses into corresponding variations in translucency of a recording medium by varying the thickness of the sound track on the medium.

Other objects and corresponding advantages, such for example as greater fidelity in reproduction, simplicity of construction of the equipment required, facility in use, and adaptability to greater tolerances in the recorded impressions of sound patterns in translucent values than heretofore possible, will be apparent to those of skill in the art upon an examination of the following description read in the light of the accompanying drawings in which.

Figures 1, 4:
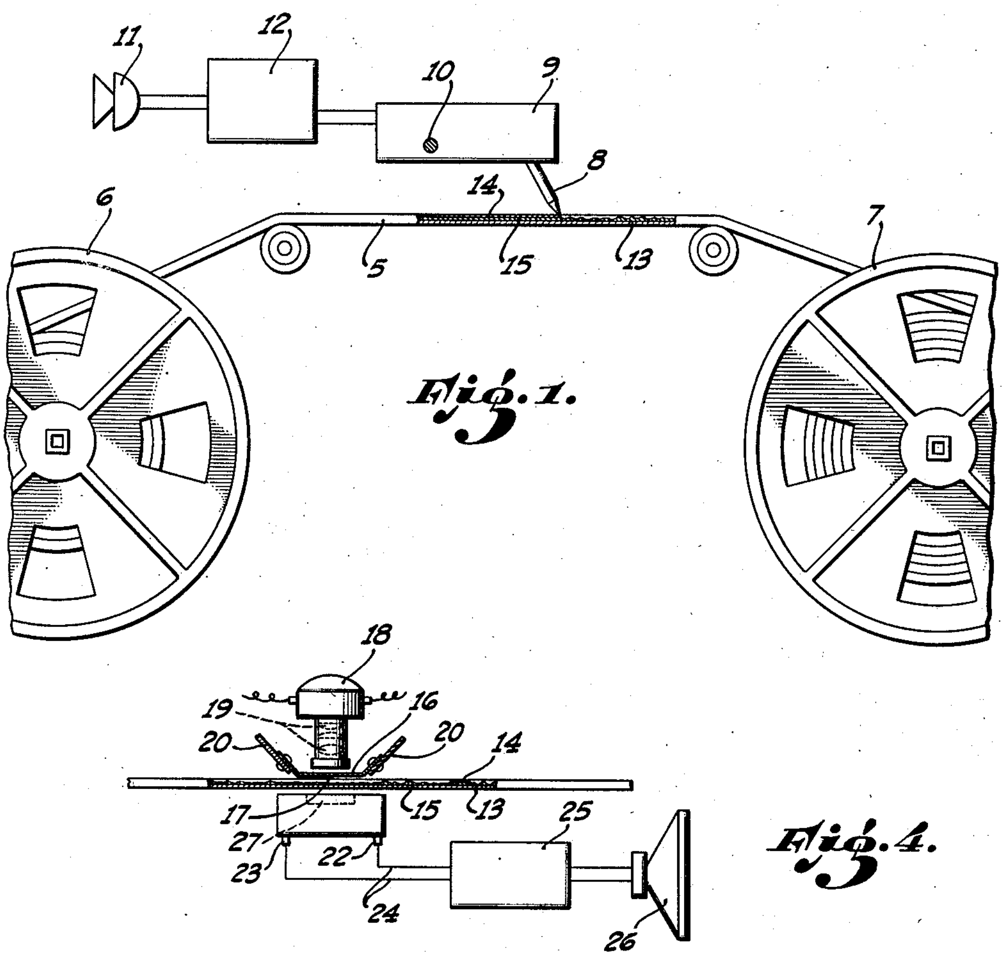
Fig. 1 is a diagrammatic view of the equipment required for recordation, and illustrating its use upon a tape recording medium, shown, partially, in section.
Fig. 4 is a diagrammatic view of the reproducing unit.

Referring to the drawings in detail, the numerals of which indicate similar parts throughout the several views, 5 designates generally a tape on which a sound record is adapted to be registered. It will be understood that while the recording media of the embodiments of my invention herein illustrated and described are in the form of tape, their novel features are equally well adapted for embodiment in disk, cylinder, or other form. Where the recording medium consists of tape, it is carried on reels, being drawn from one of the reels 6 through suitable guide and supporting means (not shown) associated with the recording unit by a power-driven take-up reel 7. Tape 5 is supported, guided, and moved in a like manner through a reproducing unit, of a type hereinafter referred to, when reproduction of the sound record is desired.

Referring particularly to Fig. 1, the recording unit, which is preferably magnetic, comprises generally a stylus 8 in combination with means for causing vibration of the stylus in synchronization with sound impulses intended for recordation. To this end, stylus 8 is connected to a diaphragm (not shown) enclosed in a magnetic recording head of a type well known in the art, and generally designated by numeral 9, which is carried on a pin 10, disposed axially transverse to the direction of movement of tape 5, journalled in suitable bearings (not shown), whereby stylus 8 may be tilted into and out of contact with the tape. The sound impulses to be recorded are transposed into electrical impulses by a microphone 11, and are magnified by the amplifier 12 to actuate the magnetically-controlled diaphragm of the recording head 9.

The recording medium 5 comprises, in the embodiment shown in Figs. 1 and 4, a transparent base 13, composed of Celluloid or the like coated with two layers of dyed substances, such as a gelatin compound. It will be understood, however, that the base may be composed of a translucent material which is not transparent. It is, however, essential that the upper or surface layer 14 be very thin but completely opaque to both visible and infra-red light. Moreover, the surface layer 14 is sufficiently renitent to resist penetration by stylus 8 when not activated by the diaphragm. The lower layer or underlayer 15 is, however, soft and impressionable, and carries the sound pattern, reproducible by the equipment herein contemplated, which is impressed in the underlayer 15. Layer 15 is translucent, whereby a registerable difference in degree of translucency results from the successive variations in thickness of the layer incident to impressing the record in accordance with the method hereof.

The sound track is formed in tape 5 by the recording unit incident to lowering stylus 8 into contact with the tape, and initiating, coincidentally, the audition and the rotation of the take-up reel, to move the tape against the stylus. The stylus cuts through the opaque surface 14 in response to vibration of the diaphragm of head 9, and forms an indented pattern in the dyed underlayer 15. As the original thickness of the underlayer 15 is uniform, the indentation of this layer by the stylus varies the thickness of the layer by removing a minute portion thereof, correspondingly varying the translucency of the track on the line of movement of the stylus, whereby a continuous pattern, correlated with the succession of sound impulses and characterized by penetration of layer 14 and varying thicknesses of the layer 15 is formed on the tape.

The reproducing equipment consists of the reels 6 and 7 and guiding and supporting mechanism (not shown) for carrying tape 5 beneath a mask diaphragm 16, which is provided with a narrow slit 17 for the passage of a beam of light onto the tape. The light beam, emanating from a light source 18 is directed through the slit by lenses 19 (shown in dotted lines in Fig. 4.) Mask 16 is supported in a position very close to tape 5 by suitable brackets 20, in order that the light beam is extremely narrow at the surface of the tape. Where the stylus has removed the opaque surface layer 14, the light passes through the underlayer 15 and is directed into a photo-electric cell 21 of conventional construction to produce the sound current from the positive to the negative terminals 22 and 23, respectively, of the cell, fluctuating in value with the intensity of the light which is determined by the thickness of the sound track in layer 15, i. e., with the depth of the indentations produced by stylus 8 in the recording operation, as the tape is moved through the light beam. A filter may be interposed between the tape and photo-electric cell, as indicated at 27, for a purpose hereinafter described. The terminals 22 and 23 of the cell are connected by wires 24—24 in a circuit through amplifier 25 and loud speaker 26 in a conventional manner, the electrical impulses being transposed into sound vibrations by the speaker.

It will thus be seen that it is essential that the surface layer 14 be opaque, while the underlayer 15 must be translucent, whereby variations in thickness effected by stylus 8 in forming the sound track produces a corresponding pattern in the translucency of the track. To this end, in the embodiment of Fig. 1 the thin surface layer 14 is composed of an opaque substance, and the underlayer consists of a material dyed a uniform gray. It will be understood that while the underlayer is translucent, in those reaches of the sound track where the impression made by the stylus is slight, the intensity of the light permitted to penetrate the tape will be correspondingly very low, and conversely, where a deep impression is made, the resultant thin sound track will offer very little resistance to the passage of the beam of light.

With a tape having a black and gray dyed sound track, a white light may be effectively used for reproduction purposes. However, in a modified form of the invention, the tape is coated with a surface layer of a blue dyed substance and an underlayer of red. Even though both layers are translucent, a filter or a combination of filters, interposed between the tape and photo-electric cell 21, may be utilized to filter out all light passing through the blue surface layer which would activate the photo-electric cell while passing the clear red beam to the cell. Thus, the blue layer, where it occurs on the sound track, would be in effect opaque in a reproducing unit incorporating such a filter.

Figure 2:
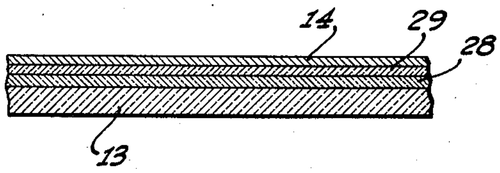
Fig. 2 is a broken sectional view of a slightly modified form of recording medium.

In Fig. 2 I have illustrated a tape having colored layers of the character last above noted. In this embodiment, however, two translucent underlayers 28 and 29 are provided. The layer 29 immediately below the "opaque" surface is a tone of red, for example, while the layer 28 therebelow in contact with the base is a pink tint.

Figure 3:
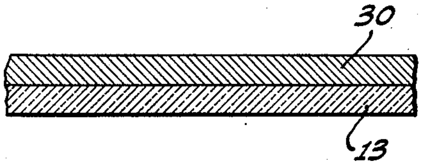
Fig. 3 is a longitudinal section of another embodiment of recording medium.

It will be appreciated that the opaque layer 14 may be omitted or, if the renitent quality of layer 14 is desired, such layer may be transparent if the full thickness of the underlayer or layers offers sufficient resistance to the passage of the light so as to obviate the reception by the photoelectric cell 21 of light of an intensity to effectively activate the latter. Fig. 3 illustrates a preferred embodiment of recording media in which the base 13 is provided with a single layer 30 of impressionable substance. This layer may be gray or any single color or a multi-color blend, having an effective light transmission range from substantial opacity to substantial transparency depending upon the thickness of the portion thereof, to which the light is directed, i. e., upon the depth of the impression formed incident to the recordation. The combination of a colored coating with a filter 27 adapted to pass only light of that color has the added advantage of obviating the necessity of a light-tight seal between the photoelectric cell and tape 5, as white or other colored light from external sources would not pass through the filter and, accordingly, would not interfere with faithful transcription of the recorded sound pattern.

In this description and in the claims annexed hereto, the term "opaque" or "opacity," as applied to a coating carried by the tape, will be understood to mean that the path of light is accordingly interrupted either at the surface of the layer referred to or by the filter, and that in any embodiment the color or black dye of the surface layer is effective to block substantially all light from reaching the cell. Many colors other than red or blue in either of the layers may be substituted in specific embodiments of the tape, and the selection of the filter or filters to be employed therewith in the reproducing unit to attain the effect desired will be within the skill of those in the art. In the following claims the term "translucent" as applied to the base 13 is used to designate a material capable of transmitting light with or without diffusion, and accordingly, includes materials which are clearly transparent as well as those through which only certain rays of light will pass. The term "translucent" as it applies in the following claims to the cutting layer, corresponding to layers 15, 28, 29 or 30 or equivalent thereof, contemplates a material adapted to pass certain rays of light but which prohibits the passage of other rays of light and accordingly the material so identified distinguishes from clearly transparent materials.

What I claim and desire to secure by Letters Patent is:

1. A recording medium, comprising a transparent base and an intermediate layer of translucent material normally of uniform thickness superimposed upon said base, and an opaque surface layer, the degree of translucency of said intermediate layer being variable in response to variation of the thickness thereof, whereby a sound pattern in translucency of said intermediate layer may be produced by varying the thickness of said last-named layer.

2. A recording medium, comprising a translucent base, a translucent layer superimposed upon said base, and an opaque layer coating said translucent layer, both of said layers bearing an indented sound track, the depth of the indentations being correlated with the amplitude, period and frequency of the sound impulses recorded, the translucency of the first-named layer being variable with the thickness of the sound track to form a pattern in degree of translucency of the layer corresponding to the sound pattern.

3. A recording medium comprising a translucent base, several coatings of an impressionable substance, a sound track in said coatings characterized by an indented pattern corresponding to the sound pattern to be recorded, said coatings being of different blended shades of color, whereby the sound track varies in translucency with the depth of the indentations.

4. A recording medium comprising a translucent base, a colored coating of an impressionable substance on said base, a second coating of impressionable substance of a different color between said base and said first coating, said coatings characterized by an indented pattern therein corresponding to a sound pattern whereby the sound track varies in translucency with the depth of the indentations and correspond in its variable degree of translucency to said sound pattern.

5. A recording medium comprising a translucent base, a multi-colored coating of an impressionable substance on said base, on opaque layer superposed upon said coating, said coating having a sound track therein comprising a reproducible pattern in translucency corresponding with an indented pattern formed in said substance, the indentations and corresponding variations in translucency of the coating being correlated with a sound pattern to be reproduced.

JOSEPH B. WALKER.

REFERENCES CITED

The following references are of record in the file of this patent:

UNITED STATES PATENTS

| Number | Name | Date |
|---|---|---|
| 1,707,243 | Wildhaber | Apr. 2, 1929 |
| 1,919,116 | Miller | July 18, 1933 |
| 1,919,117 | Miller | July 18, 1933 |
| 1,956,626 | Robbins | May 1, 1934 |
| 2,005,847 | Schmidt | June 25, 1935 |
| 2,008,092 | Biber | July 16, 1935 |
| 2,032,741 | Dippel | Mar. 3, 1936 |
| 2,040,693 | Huguenard | May 12, 1936 |
| 2,086,934 | Bonneau | July 13, 1937 |
| 2,093,215 | Six | Sept. 14, 1937 |
| 2,163,087 | De Boer | June 20, 1939 |
| 2,224,170 | Van Der Mevlen | Dec. 10, 1940 |
| 2,273,916 | Westerkamp | Feb. 24, 1942 |